US 8,385,347 B2

(12) United States Patent
Park et al.

(10) Patent No.: US 8,385,347 B2
(45) Date of Patent: Feb. 26, 2013

(54) MOBILE NODE FOR OBTAINING IP ADDRESS ALLOCATION INFORMATION, DATA SERVER FOR PROVIDING IP ADDRESS ALLOCATION INFORMATION, AND METHOD OF PROVIDING IP ADDRESS ALLOCATION INFORMATION

(75) Inventors: Soo-hong Park, Yongin-si (KR); Young-keun Kim, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 877 days.

(21) Appl. No.: 11/513,251

(22) Filed: Aug. 31, 2006

(65) Prior Publication Data

US 2007/0058582 A1    Mar. 15, 2007

Related U.S. Application Data

(60) Provisional application No. 60/715,605, filed on Sep. 12, 2005.

(30) Foreign Application Priority Data

Mar. 10, 2006    (KR) .................. 10-2006-0022870

(51) Int. Cl.
*H04W 4/00* (2009.01)
*G06F 15/16* (2006.01)
(52) U.S. Cl. ......... 370/395; 370/329; 370/331; 709/230
(58) Field of Classification Search .......... 370/229–466; 455/436–455; 709/220–230, 245–249
See application file for complete search history.

(56) References Cited

U.S. PATENT DOCUMENTS

| | | | | |
|---|---|---|---|---|
| 6,704,789 B1* | 3/2004 | Ala-Laurila et al. | .......... | 709/230 |
| 6,965,584 B2* | 11/2005 | Agrawal et al. | .......... | 370/331 |
| 7,072,338 B2* | 7/2006 | Tsuchiya et al. | .......... | 370/392 |
| 7,272,123 B2* | 9/2007 | Wall | .......... | 370/331 |
| 7,286,537 B2* | 10/2007 | Roh | .......... | 370/392 |
| 7,315,519 B2* | 1/2008 | Sarikaya et al. | .......... | 370/310 |
| 7,548,523 B2* | 6/2009 | Babbar et al. | .......... | 370/331 |
| 2002/0035624 A1* | 3/2002 | Kim | .......... | 709/222 |
| 2003/0225892 A1* | 12/2003 | Takusagawa et al. | .......... | 709/227 |
| 2004/0081122 A1* | 4/2004 | Koodli et al. | .......... | 370/329 |
| 2004/0184467 A1 | 9/2004 | Watanabe | | |
| 2005/0068969 A1* | 3/2005 | Park et al. | .......... | 370/400 |
| 2005/0265360 A1* | 12/2005 | Kim et al. | .......... | 370/400 |
| 2006/0187858 A1* | 8/2006 | Kenichi et al. | .......... | 370/254 |

(Continued)

FOREIGN PATENT DOCUMENTS

EP    1357725    10/2003
EP    1 473 901 A2    11/2004

(Continued)

OTHER PUBLICATIONS

Bound et al. Internet Draft: Dynamic Host Configuration Protocol for IPV6 (DHCPv6)—Draft-ietf-dhc-dhcpv6-25.txt, published May 24, 2003, pp. 1-90 printed from www.ietf.org.*

(Continued)

*Primary Examiner* — M. Phan
(74) *Attorney, Agent, or Firm* — Staas & Halsey LLP

(57) ABSTRACT

A mobile node transmits a frame requesting IP address allocation information needed to obtain an IP address in a neighboring network; receives a frame including the IP address allocation information requested in the transmitted frame; and obtains an IP address in the neighboring network based on the IP address allocation information in the received frame to move to the neighboring network.

12 Claims, 6 Drawing Sheets

U.S. PATENT DOCUMENTS

| | | | | |
|---|---|---|---|---|
| 2007/0002833 | A1* | 1/2007 | Bajic | 370/352 |
| 2007/0076681 | A1* | 4/2007 | Hong et al. | 370/349 |
| 2007/0204155 | A1* | 8/2007 | Dutta et al. | 713/168 |
| 2008/0130647 | A1* | 6/2008 | Ohba et al. | 370/392 |
| 2009/0219894 | A1* | 9/2009 | Jee et al. | 370/332 |

FOREIGN PATENT DOCUMENTS

| | | |
|---|---|---|
| JP | 2000-115236 | 4/2000 |
| JP | 2004-104800 | 4/2004 |
| JP | 2005-12761 | 1/2005 |
| KR | 2005-6786 | 1/2005 |
| KR | 2005-12187 | 1/2005 |
| KR | 2005-48383 | 5/2005 |
| RU | 2 216 112 | 11/2003 |
| RU | 2004101041 | 6/2004 |
| WO | 2004/071111 | 8/2004 |
| WO | WO 2004/071111 A1 | 8/2004 |
| WO | WO 2004/084492 A1 | 9/2004 |
| WO | WO 2005/067229 | 7/2005 |

OTHER PUBLICATIONS

R. Droms, RFC 2131: Dynamic Host Configuration Protocol, Mar. 1997. pp. 1-43 printed from www.ietf.org.*

Office Action issued Jun. 27, 2007 by the Korean Intellectual Property Office re: Korean Patent Application No. 2006-22870 (3 pp).

Search Report issued in European Patent Application No. 06120213.1 on Feb. 12, 2007.

Wu Jon Chiung-Shien et al., "Intelligent Handoff for Mobile Wireless Internet", Mobile Networks and Applications, ACM, New York, NY, US, 2001 vol. 6, pp. 67-69.

Dirk Trossen et al., "A Dynamic Protocol for Candidate Access-Router Discovery" Mar. 14, 2003, Internet Draft, pp. 1-49.

Search Report issued in International Application No. PCT/KR2006/003614.

Written Opinion issued in International Application No. PCT/KR2006/003614.

J.C.-S. Wu et al., "Intelligent Handoff for Mobile Wireless Internet," *Mobile Networks and Applications*, vol. 6, No. 1, Jan. 2001, pp. 67-79, ACM/Kluwer special issue on wireless internet and intranet access, ISSN 1383-469X, Kluwer Academic Publishers, Hingham, MA.

Russian Office Action for corresponding Russian Application 2008109208; dated Mar. 12, 2010.

K. Itoh et al., "Development of a network mobility system supporting heterogeneous wireless access technologies," *Proceedings of the 2005 IEICE Communications Society Conference*, Sep. 20-23, 2005, Hokkaido university, Sapporo, Japan, p. 113 (total of 6 pages, including complete English translation).

Japanese Office Action issued on Apr. 24, 2009, in Japanese Patent Application No. 2006-246849 (1 page, in Japanese, no English translation).

* cited by examiner

MOBILE NODE FOR OBTAINING IP ADDRESS ALLOCATION INFORMATION, DATA SERVER FOR PROVIDING IP ADDRESS ALLOCATION INFORMATION, AND METHOD OF PROVIDING IP ADDRESS ALLOCATION INFORMATION

CROSS-REFERENCE TO RELATED APPLICATIONS

This application claims the benefit of Korean Patent Application No. 2006-22870 filed on Mar. 10, 2006, in the Korean Intellectual Property Office, and U.S. Provisional Patent Application No. 60/715,605 filed on Sep. 12, 2005, in the United States Patent and Trademark Office, the disclosures of which are incorporated herein by reference in their entirety.

BACKGROUND OF THE INVENTION

1. Field of the Invention

An aspect of the invention relates to an Internet Protocol (IP) address allocation, and more particularly to a method of obtaining IP address allocation information of a neighboring network in a mobile node to enable the mobile node to receive a new IP address when it moves to the neighboring network.

2. Description of the Related Art

A rapid increase in users of mobile communication services has led to activation of mobile communication services supporting multimedia communications, and seamless communication services have been requested by mobile users. Accordingly, it has become important to achieve a fast handover in a wireless local area network (LAN) environment based on the IEEE 802.11 specification.

FIG. 1 illustrates a wireless LAN environment in the related art.

Referring to FIG. 1, the wireless LAN environment includes a mobile node (MN) 1, an access point (AP) A 10, an access point B 20, an access point C 30, an access point D 40, an access router (AR) A 50 and an access router B 60.

The mobile node 1, which can be a mobile phone, a personal digital assistant (PDA), a notebook computer or any other wireless device capable of accessing a wireless LAN, moves between several wireless LANs. Each of the access points A, B, C and D 10, 20, 30 and 40 connects the mobile node 1 to a subnet to which the mobile node 1 belongs, thereby allowing the mobile node 1 to access a wired network like the Internet. Hereinafter, a device performing this role will be called an "access point."

The access routers A and B 50 and 60 provide the mobile node 1 with routing services in a subnet to which each of them belongs, thereby allowing the mobile node 1 to access an arbitrary node in the subnet using an optimal path.

As illustrated in FIG. 1, the wireless LAN environment in the related art will be described under the assumption that the mobile node 1 passes through a basic service set (BSS) managed by the access point A 10, a BSS managed by the access point B 20, a BSS managed by the access point C 30 and a BSS managed by the access point D 40 in sequence. BSS is a term used in the IEEE 802.11 specification, and it refers to a wireless LAN managed by a single access point.

In order to allow the moving mobile node 1 to know which access point to use for accessing a wired network, each of the access points A, B, C and D 10, 20, 30 and 40 periodically transmits a beacon signal that indicates its managed BSS.

In a communication denoted by 11 in FIG. 1, the mobile node 1, which has been positioned in the BSS managed by the access point A 10, receives a beacon signal from the access point A 10. Based on the received beacon signal, the mobile node 1 becomes aware that it is still positioned in the BSS managed by the access point A 10. The mobile node 1 accesses a wired network by way of the access point A 10, as it did previously.

In a communication denoted by 21 in FIG. 1, the mobile node 1 receives a beacon signal from the access point B 20. Based on the received beacon signal, the mobile node 1 becomes aware that the BSS in which it is positioned has changed. Accordingly, the mobile node 1 conducts a handover due to the change of the BSS, i.e., a handover in a link layer. That is, the mobile node 1 becomes aware that it is now positioned in the BSS managed by the access point B 20, and changes its link layer connection with the access point A 10 to a link layer connection with the access point B 20. Referring to the open systems interconnection (OSI) reference model, since the link layer corresponds to a second layer, the handover in the link layer is called a handover in the second layer or an L2 handover for short. The mobile node 1 accesses a wired network by way of its new access point B 20.

In the communication denoted by 22 in FIG. 1, the mobile node 1 transmits a router solicitation for proxy advertisement (RtSolPr) frame, including information that the BSS in which it is positioned has changed, to the access router A 50 by way of the access point B 20. The access router A 50, which has not received this frame through any other access router, becomes aware that the mobile node 1 is positioned within its subnet.

In the communication denoted by 23 in FIG. 1, the access router A 50 transmits a proxy router advertisement (PrRtAdv) frame, including information that the subnet has not changed, to the mobile node 1 by way of the access point B 20. The mobile node 1 that receives this frame becomes aware that it is still positioned within the subnet managed by the access router A 50. Accordingly, the mobile node 1 does not conduct a handover, i.e., a handover in an Internet Protocol (IP) layer. Referring to the OSI reference model, since the IP layer corresponds to a third layer, a handover in the IP layer is called a handover in the third layer or an L3 handover for short.

In the communication denoted by 24 in FIG. 1, the mobile node 1 receives a beacon signal from the access point B 20. Based on the received beacon signal, the mobile node 1 becomes aware that it is still positioned within the BSS managed by the access point B 20. The mobile node 1 accesses a wired network by way of the access point B 20, as it did previously.

In the communication denoted by 31 in FIG. 1, the mobile node 1 receives a beacon signal from the access point C 30. Based on the received beacon signal, the mobile node 1 becomes aware that the BSS in which it is positioned has changed. Accordingly, the mobile node 1 conducts a handover due to the change of the BSS, i.e., a handover in a link layer. That is, the mobile node 1 becomes aware that it is now positioned in the BSS managed by the access point C 30, and changes the link layer connection with the access point B 20 to a link layer connection with the access point C 30. The mobile node 1 accesses a wired network by way of its new access point C 30.

In the communications denoted by 32 and 232 in FIG. 1, the mobile node 1 transmits an RtSolPr frame, including information that the BSS in which it is positioned has changed, to the access router A 50 by way of the access point C 30 and the access router B 60. The access router A 50 receives this frame by way of the access router B 60, which is a different access router, and thereby becomes aware that the mobile node 1 is not in its subnet.

In the communications denoted by 33 and 233 in FIG. 1, the access router A 50 transmits a PrRtAdv frame, including information that the subnet in which the mobile node 1 is positioned has changed, to the mobile node 1 by way of the access router B 60 and the access point C 30. The mobile node 1 that receives this frame becomes aware that the subnet in which it is positioned has changed. Accordingly, the mobile node 1 conducts a handover due to the change of the subnet, i.e., handover in an Internet Protocol (IP) layer.

In the communication denoted by 34 in FIG. 1, the mobile node 1 receives a beacon signal from the access point C 30. Based on the received beacon signal, the mobile node 1 becomes aware that it is still positioned in the BSS managed by the access point C 30. The mobile node 1 accesses a wired network by way of the access point C 30, as it did previously.

In the communication denoted by 41 in FIG. 1, the mobile node 1 receives a beacon signal from the access point D 40. Based on the received beacon signal, the mobile node 1 becomes aware that the BSS in which it is positioned has changed. Accordingly, the mobile node 1 conducts a handover due to the change of the BSS, i.e., a handover in the link layer. That is, the mobile node 1 becomes aware that it is now positioned within the BSS managed by the access point D 40, and changes the link layer connection with the access point C 30 to a link layer connection with the access point D 40. The mobile node 1 accesses a wired network by way of its new access point D 40.

In the communication denoted by 42 in FIG. 1, the mobile node 1 transmits an RtSolPr frame, including information that the BSS in which it is positioned has changed, to the access router B 60 by way of the access point D 40. The access router B 60, which has not received this frame through any other access router, becomes aware that the mobile node 1 is positioned within its subnet.

In the communication denoted by 43 in FIG. 1, the access router B 60 transmits a PrRtAdv frame, including information that the subnet has not changed, to the mobile node 1 by way of the access point D 40. The mobile node 1 that receives this frame becomes aware that it is positioned within the subnet managed by the access router B 60. Accordingly, the mobile node 1 does not conduct a handover due to the change of the subnet, i.e., a handover in the IP layer.

As described above, the mobile node 1 communicates with an access router to obtain information of a change of a subnet that it accesses, since it does not know whether the subnet has changed. In other words, the mobile node communicates with the access router in order to determine whether to conduct the handover only in the link layer, or to conduct the handovers in both the link layer and the IP layer.

A handover due to movement of a mobile node between homogeneous networks is illustrated in FIG. 1. However, research to support seamless mobility between heterogeneous networks is being conducted.

Especially, wireless technology recently gaining popularity as a main technology is classified into wireless local area networks (WLAN) (the IEEE 802.11 standard) and cellular networks. To support mobility between these wireless networks, organizations participating in wireless standardization, including IEEE 802, 3GPP, 3GPP2, ITU-T and IETF, are actively focusing on solving known problems.

Among these, research on IEEE 802 is the most active, especially IEEE 802.21 WG (Working Group) and IEEE 802.11 WIEN SG (Wireless Interworking with External Networks Study Group).

IEEE 802.21 WG is focused on standardization to provide media independent solutions for mobility between heterogeneous networks. In particular, it has created a new layer 2.5 model between a Media Access Control (MAC) layer and its upper IP layer, thereby making it possible to support efficient mobility in various wired and wireless environments.

In connection with this, the working group of IEEE 802.21 has been conducting discussions about a method of realizing a media independent handover (MIH) protocol. Information about the MIH protocol can be found on the Internet at www.ieee802.org/21.

When a mobile node operating according to the MIH protocol moves to a heterogeneous network, the mobile node can conduct continuous communication since a handover is possible when an access point in the target heterogeneous network supports the MIH protocol.

The above handover in the heterogeneous network may be conducted in the link layer or the IP layer, the same as a handover in a homogeneous network.

A handover in the IP layer moves the mobile node to a new network. In order for the mobile node to receive a new IP address in the new network, the mobile node obtains information about a version of an IP address used in the new network (e.g., Internet Protocol version 4 (IPv4) or Internet Protocol version 6 (IPv6)), and information about a method of allocating an IP address in the new network (e.g., a direct-input allocation method or an auto-allocation method) by communicating with an access point and an access router of the new network.

In the related art described above, when a mobile node moves to a neighboring network, it must temporarily stop providing services while it determines a method of allocating an IP address in the neighboring network in order to receive a new IP address, which may be a problem for mobile communication services supporting seamless communication to a user.

SUMMARY OF THE INVENTION

An aspect of the invention is to enable a mobile node to immediately receive a new IP address when the mobile node moves to a neighboring heterogeneous or homogeneous network based on IP address allocation information of the neighboring network obtained in advance, i.e., before the mobile node moves to the neighboring network.

According to an aspect of the invention, there is provided a mobile node that transmits a frame requesting IP address allocation information needed to obtain an IP address in a neighboring network; receives a frame including the IP address allocation information requested in the transmitted frame; and obtains an IP address in the neighboring network based on the IP address allocation information in the received frame to move to the neighboring network.

According to another aspect of the invention, there is provided a method of providing IP address allocation information, the method including transmitting a frame requesting IP address allocation information needed to obtain an IP address in a neighboring network; receiving a frame including the IP address allocation information requested in the transmitted frame; and obtaining an IP address in the neighboring network based on the IP address allocation information in the received frame to move to the neighboring network.

According to another aspect of the invention, there is provided a data server that receives a frame requesting IP address allocation information needed to obtain an IP address in a second network from a mobile node located in a first network; and transmits a frame including the IP address allocation information requested in the received frame.

According to another aspect of the invention, there is provided a method of providing IP address allocation information, the method including receiving a frame requesting IP address allocation information needed to obtain an IP address in a second network from a mobile node located in a first network; and transmitting a frame including the IP address allocation information requested in the received frame.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of various embodiments, taken in conjunction with the accompanying drawings of which.

DETAILED DESCRIPTION OF THE EMBODIMENTS

Figure 1:
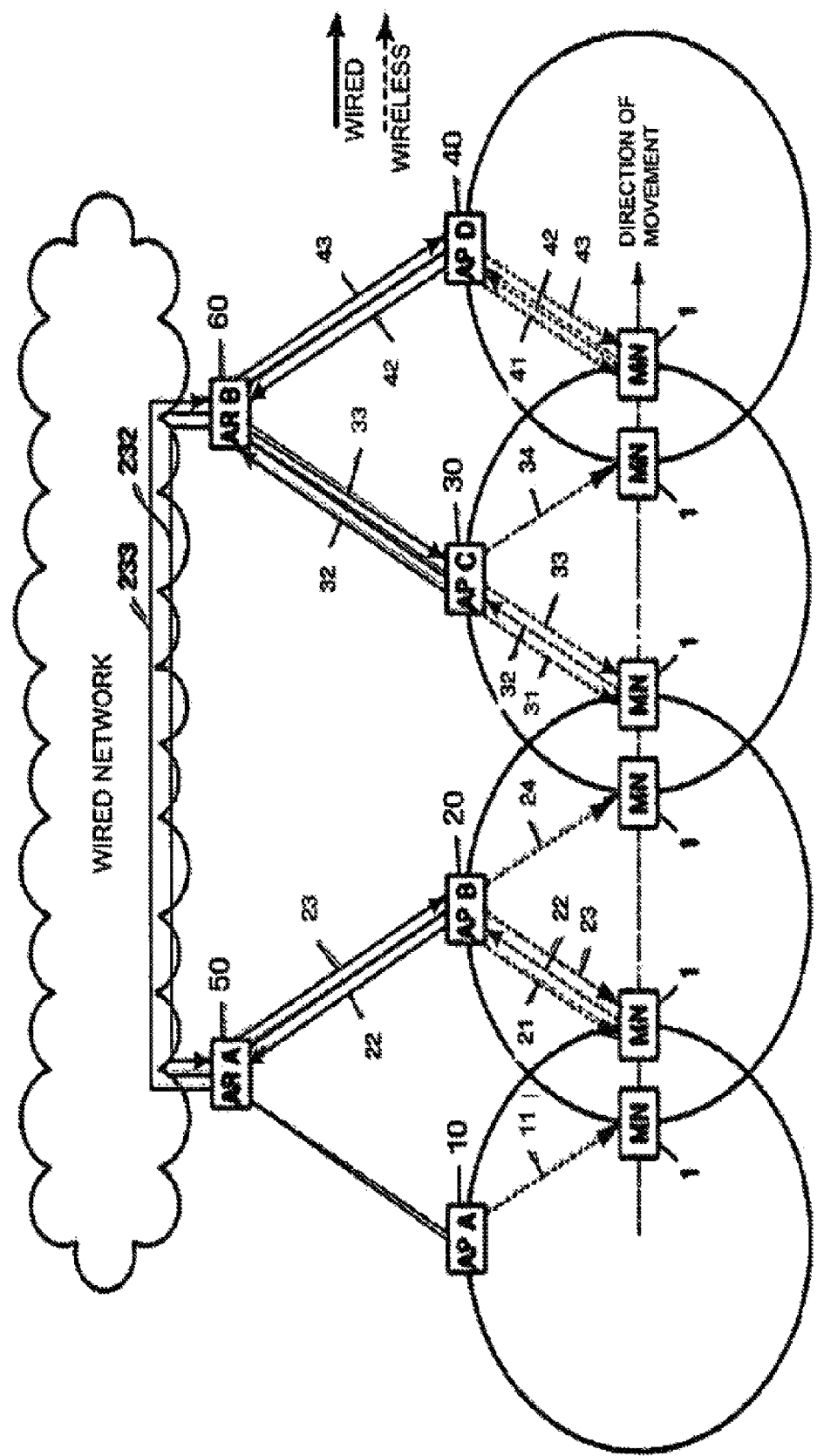
FIG. 1 illustrates a wireless LAN environment in the related art.

Reference will now be made in detail to various embodiments of the invention, examples of which are illustrated in the accompanying drawings, wherein like reference numerals refer to like elements throughout. The embodiments are described below in order to explain the invention by referring to the figures.

Aspects of the invention may, however, be embodied in many different forms, and should not be construed as being limited to the embodiments set forth herein. Rather, these embodiments are provided merely so that this disclosure will be thorough and complete and will fully convey the principle and spirit of the invention to those skilled in the art.

Aspects of the invention are described hereinafter with reference to block diagrams and a flowchart of an access point and a method of providing IP address allocation information. It should be understood that each block of the block diagrams and the flowchart, and combinations of blocks of the block diagrams and the flowchart, can be implemented by computer program instructions. These computer program instructions can be provided to a processor of a general purpose computer, a special purpose computer, or other programmable data processing apparatus to produce a machine, so that the computer program instructions, when executed by the processor, create ways of implementing the functions specified in the blocks of the block diagrams and the flowchart.

The computer program instructions may also be stored in a computer-usable memory or a computer-readable memory that can direct a computer or other programmable data processing apparatus to function in a particular manner, so that the computer program instructions stored in the computer-usable memory or the computer-readable memory produce an article of manufacture including computer program instructions that implement the functions specified in the blocks of the block diagrams and the flowchart.

The computer program instructions may also be loaded into a computer or other programmable data processing apparatus to cause the computer or other programmable data processing apparatus to perform a series of operations, thereby producing a computer-implemented process that implements the functions specified in the blocks of the block diagrams and the flowchart.

Instructions that implement the functions specified in the blocks of the block diagrams and flow charts when executed by a computer or a machine may be embodied in a computer-readable medium or a machine-readable medium.

Each block the of the block diagrams and the flowchart may represent a module, segment, or portion of code which includes one or more executable instructions for implementing the function(s) specified in the block. It should also be noted that in some alternative implementations, the functions specified in the blocks may occur out of order. For example, two blocks shown in succession may in fact be executed substantially concurrently or in reverse order, depending upon the functionality involved.

Figure 2:
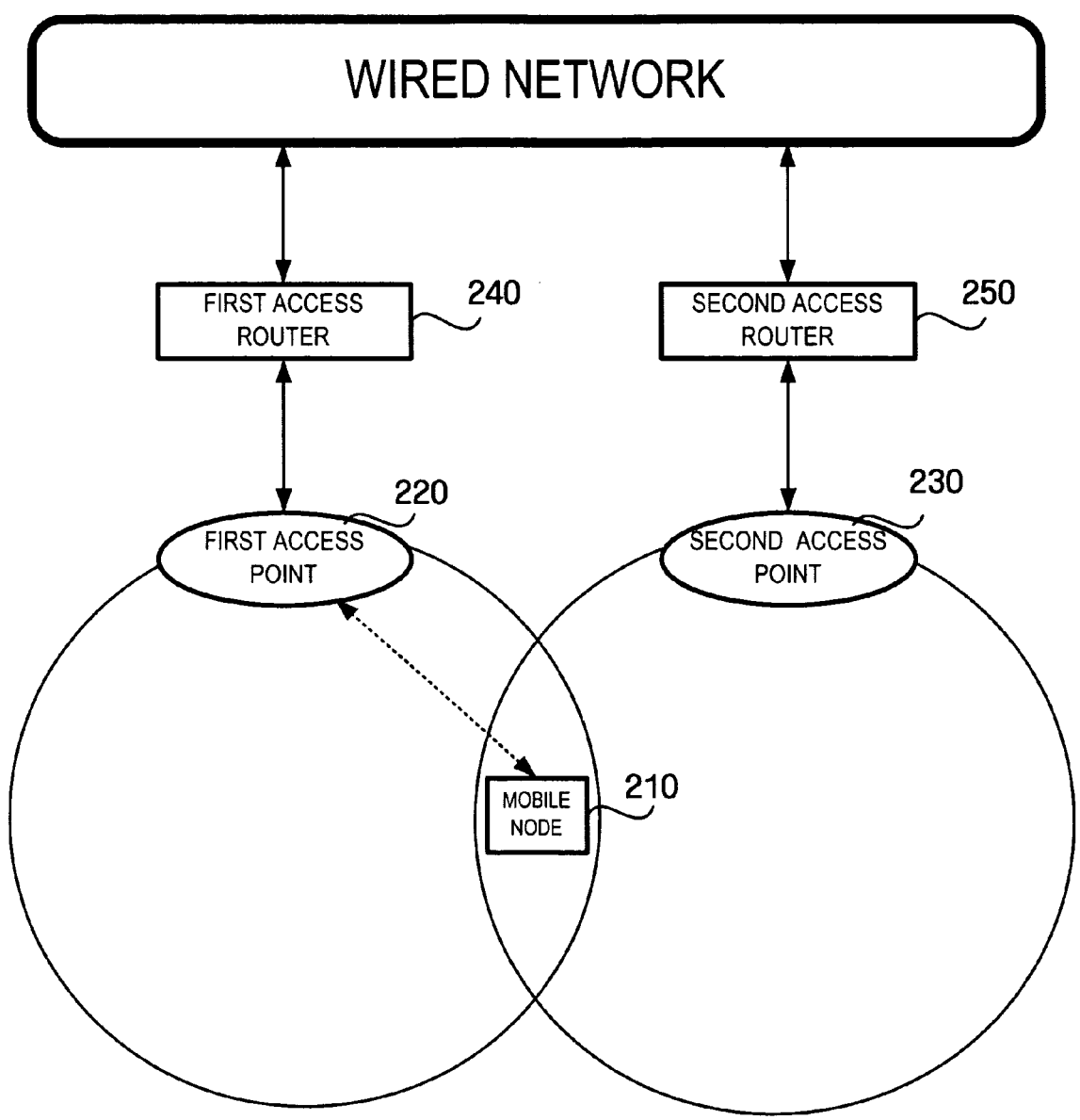
FIG. 2 illustrates a configuration of a system according to an aspect of the invention.

FIG. 2 illustrates a configuration of a system 200 according to an aspect of the invention. The system 200 includes a first access router 240, a second access router 250, a first access point 220, a second access point 230 and a mobile node 210.

The mobile node 210, which can be a mobile phone, a PDA, a notebook computer or any other wireless device capable of accessing a wireless LAN, refers to a node moving between several wireless LANs.

The first access point 220 and the second access point 230 connect the mobile node 210 to respective subnets to which they belong, thereby allowing the mobile node 210 to access a wired network such as the Internet.

The first access router 240 and the second access router 250 provide the mobile node 210 with routing services in their respective subnets, thereby allowing the mobile node 210 to connect to an arbitrary node in each of the subnets using an optimal path. Communications among these devices can be conducted according to a conventional router communication method.

As illustrated in FIG. 2, it is assumed that the mobile node 210 passes through the subnet managed by the first access point 220 and the subnet managed by the second access point 230, and it is assumed that the respective subnets managed by the first access point 220 and the second access point 230 form a heterogeneous network.

For example, the subnet managed by the first access point 220 may be a BSS defined by the IEEE 802.11 specification, and the subnet managed by the second access point 230 may correspond to a cell of a cellular network, but the invention is not limited to this specific configuration. Any heterogeneous network formed by any types of subnets managed by the first access point 220 and the second access point 230 can be used.

It is assumed that the first access router 240, the second access router 250, the first access point 220, the second access point 230 and the mobile node 210 support the MIH protocol defined in the IEEE 802.21 specification. Accordingly, even when the mobile node 210 moves from the first subnet to the second subnet, the mobile node 210 can continuously conduct communication by receiving a new IP address when it moves to the second subnet.

The mobile node 210 obtains information about a method of receiving an IP address in the second subnet (hereinafter, referred to as "IP address allocation information") in advance before moving to the second subnet. The IP address allocation information may also be referred to as MIH IP address allocation information because it is used in implementing the MIH protocol.

IP address allocation information includes information about a version of an IP address used in the new network (e.g., IPv4 or IPv6), and a method of allocating an IP address in the new network (e.g., a direct-input allocation method or an auto-allocation method).

The mobile node 210 can receive the IP address allocation information of the second subnet (i.e., a neighboring network) when the mobile node 210 is positioned in the first subnet. To accomplish this, the mobile node 210 may receive the IP address allocation information from the first access point 220, and the first access point 220 may obtain the IP address allocation information from the first access router 240. The first access router 240 may obtain the IP address allocation information from the second access router 250 via the wired network. The second access router 250 is able to provide the IP address allocation information of the second subnet to which it belongs, i.e., information about a version of an IP address used in the second subnet and a method of allocating an IP address in the second subnet, because it provides routing services in the second subnet.

That is, when the first access router 240 receives the IP address allocation information of the second subnet from the second access router 250 in the second subnet through the wired network and transmits the received IP address allocation information to the first access point 220, the first access point 220 provides the received IP address allocation information to the mobile node 210 positioned in the first subnet.

At this time, the first access point 220 generates and transmits a frame to carry the IP address allocation information to the first subnet that is managed by the first access point 220, whereby the IP address allocation information is transmitted to the mobile node 210. An example of this frame will be described later with reference to FIG. 4. The first access point 220 may periodically broadcast this frame.

According to another aspect of the invention, the mobile node 210 requests the IP address allocation information of the second subnet from the first access point 220, the first access point 220 requests the IP address allocation information from the first access router 240, the first access router 240 requests the IP address allocation information from the second access router 250 via the wired network, the second access router 250 transmits the IP address allocation information to the first access router 240 via the wired network, the first access router 240 transmits the IP address allocation information to the first access point 220, and the first access point 220 transmits the IP address allocation information to the mobile node 210. Accordingly the mobile node 210 may obtain the IP address allocation information of the second subnet in advance, i.e., before the mobile node 210 moves to the second subnet.

Figure 3:
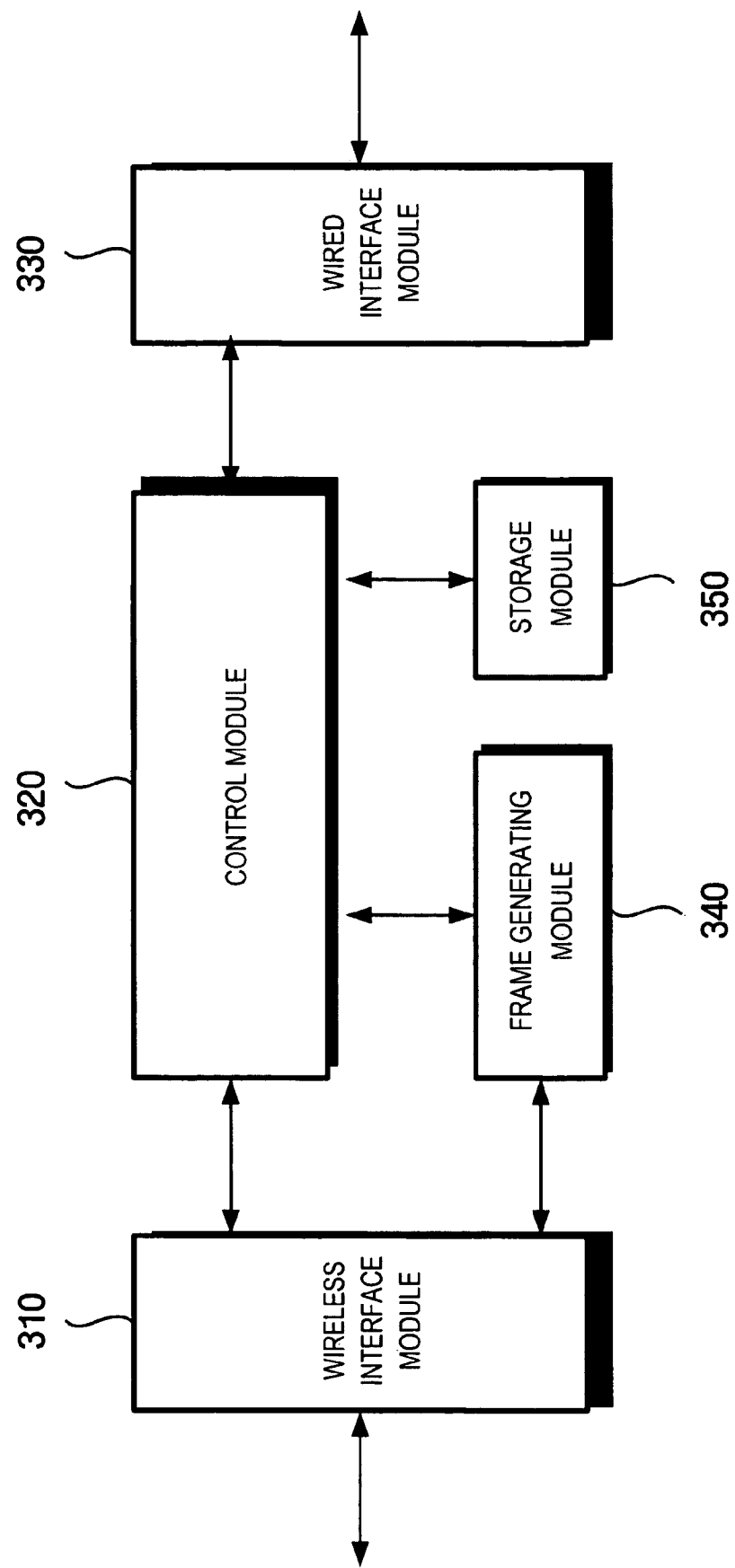
FIG. 3 illustrates a configuration of an access point according to an aspect of the invention.

FIG. 3 illustrates a configuration of an access point that depicts the general configuration of the first access point 220 or the second access point 230 shown in FIG. 2, according to an aspect of the invention.

Referring to FIG. 3, the access point includes a wireless interface module 310, a wired interface module 330, a frame generating module 340, a storage module 350 and a control module 320.

The wireless interface module 310 is a module that communicates with a mobile node belonging to the subnet managed by the access point via a wireless network, and the wired interface module 330 is a module that connects to a wired network by way of an access router.

The storage module 350 stores IP address allocation information of an access point in a neighboring heterogeneous subnet that is received through the wired interface module 330, and the frame generating module 340 generates a predetermined frame including the IP address allocation information under control of the control module 320, and controls the wireless interface module 310 to transmit the frame to the mobile node.

Figure 4:
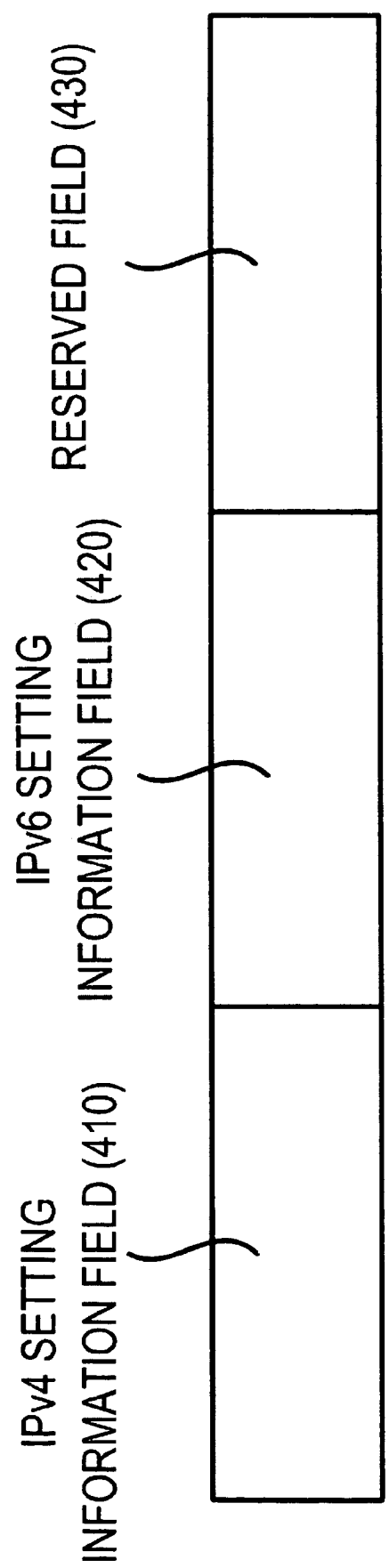
FIG. 4 illustrates a configuration of a frame including IP address allocation information according to an aspect of the invention.

An example of a frame generated by the frame generating module 340 is illustrated in FIG. 4. The frame includes setting information fields 410 and 420 containing information about a version of IP address being used, and a reserved field 430 reserved for future use.

That is, the frame including the IP address allocation information may include setting information classified according to a version of an IP address being used. Since IP version 4 (IPv4) and IP version 6 (IPv6) may be used in the system 200 shown in FIG. 2 according to an aspect of the invention, the frame shown in FIG. 4 includes an IPv4 setting information field 410 and an IPv6 setting information field 420.

The IPv4 setting information field 410 includes information about a method of allocating an IP address in IPv4. The method may be a static configuration method which is a direct-input allocation method in which an IP address is directly allocated to a mobile node, or a dynamic configuration method which is an auto-allocation method in which an IP address is automatically allocated to a mobile node. Information about the specific address allocation method being used is stored as bits in the IPv4 setting information field 410. The IPv4 setting information field 410 may include extra bits reserved for future use to store information about another IP address allocation method that may be used in IPv4 in the future.

The IPv6 setting information field 420 includes information about a method of allocating an IP address in IPv6. The method may be a stateful address configuration method that keeps track of allocated address information, or a stateless address configuration method that does not keep track of allocated address information. Dynamic Host Configuration Protocol (DHCP) which is used widely in wired networks is one example of a stateful address configuration method that keeps track of allocated address information. In DHCP, a DHCP server keeps track of which addresses have been allocated to which nodes, so address conflicts do not occur. The method of allocating an IP address in IPv6 may also be a manual configuration method in which an IP address is manually allocated to the mobile node. Information about the specific address allocation method being used is stored as bits in the IPv6 setting information field 420. The IPv6 setting information field 420 may include extra bits reserved for future use to store information about another IP address allocation method that may be used in IPv6 in the future.

The control module 320 controls the operations of the other modules shown in FIG. 3 and smoothly coordinates communications between the wired network and the wireless network.

The term "module," as used herein, refers to, but is not limited to, a software or hardware component, such as a Field Programmable Gate Array (FPGA) or an Application Specific Integrated Circuit (ASIC), which performs certain tasks. A module may advantageously be configured to reside on an addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided by the components and modules may be combined into fewer components and modules or further separated into additional components and modules. In addition, components and modules may be implemented so as to reproduce one or more CPUs within a device or a secure multimedia card.

Figure 5:
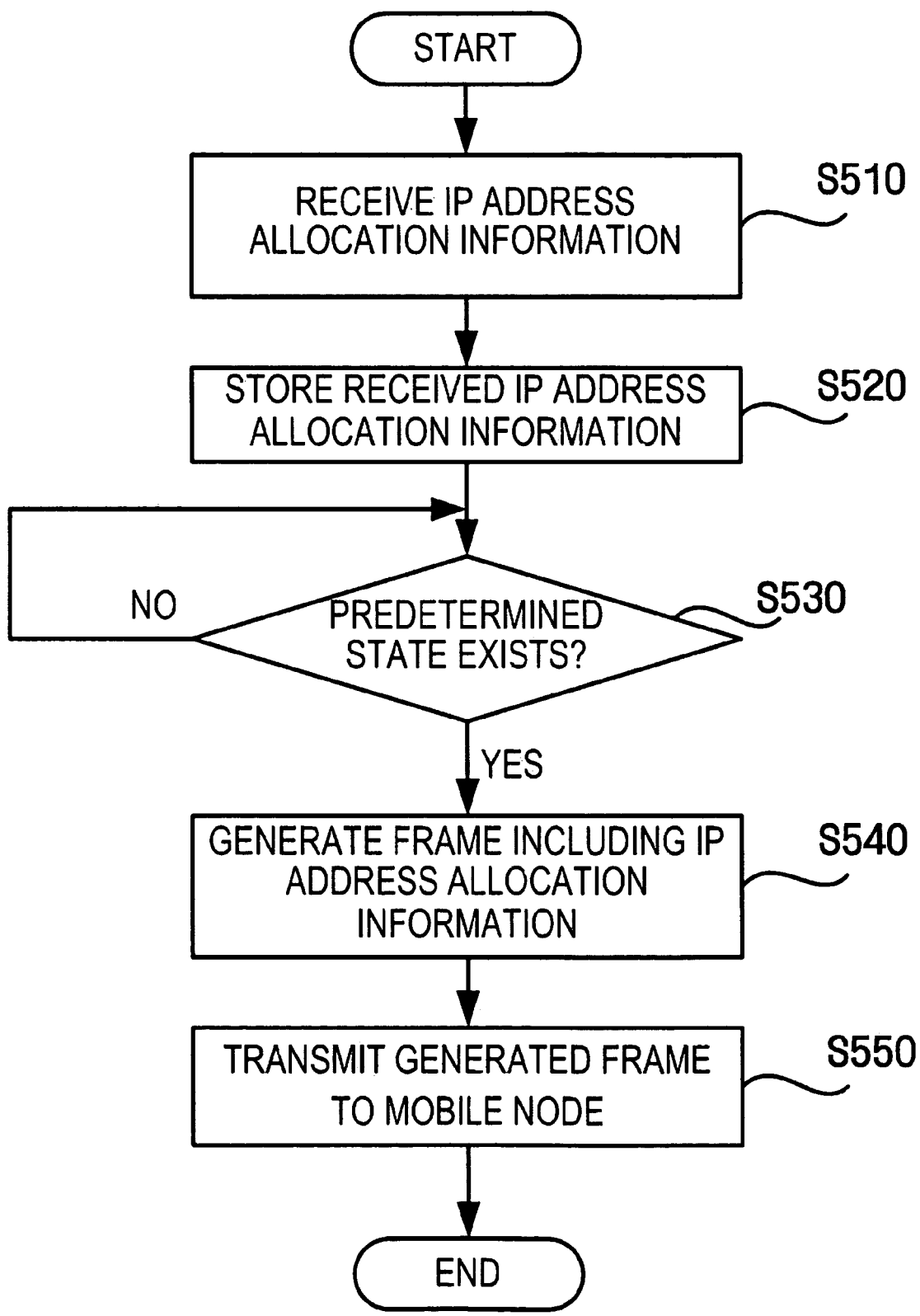
FIG. 5 is a flow chart illustrating a method of providing IP address allocation information according to an aspect of the invention.

A process in which an access point in one network provides IP address allocation information of a neighboring heterogeneous network, i.e., a neighboring heterogeneous subnet, to a mobile node positioned in the one network, is illustrated in FIG. 5, and will be described with reference to the modules illustrated in FIG. 3.

The wired interface module 330 of the access point receives IP address allocation information from a second access router that provides routing services in the neighboring heterogeneous network and is connected to a first access router which is connected to the wired interface module 330 through a wired network (block S510). The IP address allocation information may be included in routing information that the second access router transmits periodically or non-periodically to the first access router.

The control module 320 stores the IP address allocation information received by the wired interface module 330 in the storage module 350 (block S520). The control module 320 may update the IP address allocation information stored in the storage module 350 whenever the wired interface module 330 receives new IP address allocation information.

The control module 320 detects whether a predetermined state exists in which the IP address allocation information stored in the storage module 350 is to be transmitted to a mobile node in the subnet managed by the access point (block S530).

One example of such a predetermined state is a state in which the access point is ready to broadcast a beacon signal defined in the IEEE 802.11 in a wireless LAN environment. Another example of such a predetermined state is a state in which the access point has received a request for the IP address allocation information from the mobile node. However, the invention is not limited to these predetermined states, and the predetermined state can be any state in which the IP address allocation information stored in the storage module 350 is to be transmitted to the mobile node.

When it is determined that a predetermined state exists, the control module 320 commands the frame generating module 340 to generate a frame including the IP address allocation information stored in the storage module 350, and the frame generating module 340 generates a frame as illustrated in FIG. 4 in response to the command (block S540).

Finally, the frame generated by the frame generating module 340 is transmitted to the mobile node through the wireless interface module 310 (block S550).

Figure 6:
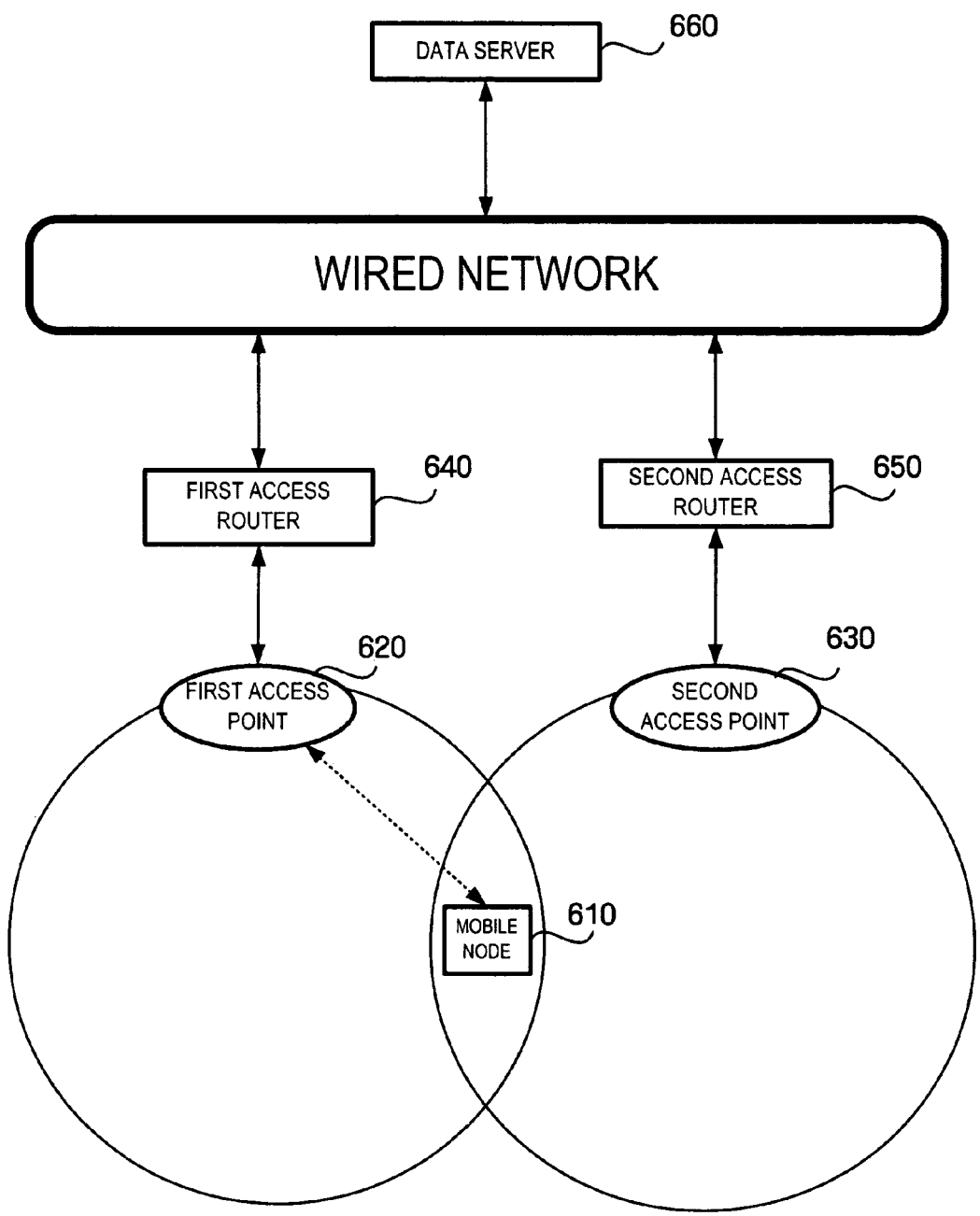
FIG. 6 illustrates a configuration of a system according to another aspect of the invention.

FIG. 6 illustrates a configuration of a system 600 according to another aspect of the invention. The system 600 includes a first access router 640, a second access router 650, a first access point 620, a second access point 630, a mobile node 610 and a data server 660.

The mobile node 610, which can be a mobile phone, a PDA, a notebook computer or any other wireless device capable of accessing a wireless LAN, refers to a node moving between several wireless LANs.

The first access point 620 and the second access point 630 connect the mobile node 610 to respective subnets to which they belong, thereby allowing the mobile node 610 to access a wired network such as the Internet.

The first access router 640 and the second access router 650 provide the mobile node 610 with routing services in their respective subnets, thereby allowing the mobile node 610 to connect to an arbitrary node in each of the subnets using an optimal path. Communications among these devices can be conducted according to a conventional router communication method.

The data server 660 periodically or non-periodically receives and stores IP address allocation information from the first access router 640 and the second access router 650 via the wired network, and provides the stored IP address allocation information when requested by the first access router 640 or the second access router 650.

As illustrated in FIG. 6, it is assumed that the mobile node 610 passes through the subnet managed by the first access point 620 and the subnet managed by the second access point 630, and it is assumed that the respective subnets managed by the first access point 620 and the second access point 630 form a heterogeneous network.

The mobile node 610 can receive the IP address allocation information of the second subnet (i.e., a neighboring network) when the mobile node 610 is positioned in the first subnet. To accomplish this, the mobile node 610 may receive the IP address allocation information from the first access point 620, and the first access point 620 may obtain the IP address allocation information from the first access router 640. The first access router 640 may obtain the IP address allocation information from the data server 660 via the wired network.

That is, when the first access router 640 periodically or non-periodically receives the IP address allocation information of the second subnet from the data server 660 through the wired network and transmits the received IP address allocation information to the first access point 620, the first access point 620 provides the received IP address allocation information to the mobile node 610 positioned in the first subnet.

At this time, the first access point 620 generates and transmits a frame to carry the IP address allocation information to the first subnet that is managed by the first access point 620, whereby the IP address allocation information is transmitted to the mobile node 610. An example of this frame was described earlier with reference to FIG. 4. The first access point 620 may periodically broadcast this frame.

According to another aspect of the invention, the mobile node 610 requests the IP address allocation information of the second subnet from the first access point 620, the first access point 620 requests the IP address allocation information from the first access router 640, the first access router 640 requests the IP address allocation information from the data server 660 via the wired network, the data server 660 transmits the IP address allocation information to the first access router 640 via the wired network, the first access router 640 transmits the IP address allocation information to the first access point 620, and the first access point 620 transmits the IP address allocation information to the mobile node 610. Accordingly, the mobile node 610 may obtain the IP address allocation information of the second subnet in advance, i.e., before the mobile node 610 moves to the second subnet.

The difference between the system 600 illustrated in FIG. 6 and the system 200 illustrated in FIG. 2 is that the system 600 illustrated in FIG. 6 includes the data server 660 that stores IP address allocation information provided by the first access router 640 and the second address router 650, and the data server 660 provides the IP address allocation information of the second subnet to the mobile node 610 via the first access router 640 and the first access point 620 when the mobile node 610 is positioned in the first subnet that is managed by the first access point 620, and provides the IP address allocation information of the first subnet to the mobile node 610 via the second access router 650 and the second access point 630 when the mobile node 610 is positioned in the second subnet managed by the second access point 630.

However, the system 600 illustrated in FIG. 6 can also be operated like the system 200 illustrated in FIG. 2. In such an operation, the second router 650 provides the IP address allocation information of the second subnet to the mobile node 610 via the first access router 640 and the first access point 620 when the mobile node 610 is positioned in the first subnet managed by the first access point 620, and the first access router 640 provides the IP address allocation information of the first subnet to the mobile node 610 via the second access router 650 and the second access point 630 when the mobile node 610 is positioned in the second subnet managed by the second access point 630.

Aspects of the invention have been described above using a handover in a heterogeneous network as an example, but the invention is not limited to such a handover. The invention may also be applied to a handover in a homogeneous network, and the implementation of such an application will be apparent to those of ordinary skill in the art.

Aspects of the invention have been described above using an environment in which one network has a single neighboring network as an example, but the present invention is not limited to such an environment. The present invention may also be applied to an environment in which one network has several neighboring networks. In such an application, network identification information that identifies each of the neighboring networks may be provided to the mobile node together with IP address allocation information of each of the neighboring networks, thereby enabling the mobile node to obtain the IP address allocation information of the neighboring networks in advance, i.e., before the mobile node moves to any of the neighboring networks. The implementation of such an application will be apparent to those of ordinary skill in the art.

In the aspects of the invention described above, the mobile node may immediately receive a new IP address when it moves to a neighboring network based on IP address allocation information of the neighboring network obtained in advance, i.e., before the mobile node moves to the neighboring network, the mobile node does not need to temporarily stop providing services to obtain IP address allocation information for allocating an IP address in the neighboring network when it moves to the neighboring network as it is required to do in the related art, thereby providing seamless communication services to a user.

Although several embodiments of the invention have been shown and described, it would be appreciated by those skilled in the art that changes made be made in these embodiments without departing from the principle and spirit of the invention, the scope of which is defined in the claims and their equivalents.

What is claimed is:

1. A mobile node, comprising:
   a transmitting part transmitting a frame requesting IP address allocation information needed to obtain an IP address in a neighboring network;
   a receiving part receiving a frame comprising the IP address allocation information requested in the transmitted frame, and
   wherein the mobile node obtains an IP address in the neighboring network based on the IP address allocation information in the received frame to move to the neighboring network,
   wherein the IP address allocation information comprises information about a method of allocating an IP address used in the neighboring network, and
   wherein the information about a method of allocating an IP address used in the neighboring network is represented by a plurality of bits comprising at least one of:
   at least one bit for indicating that the method of allocating an IP address used in the neighboring network is an IPv4 static configuration method;
   at least one bit for indicating that the method of allocating an IP address used in the neighboring network is an IPv4 dynamic configuration method;
   at least one bit for indicating that the method of allocating an IP address used in the neighboring network is an IPv6 stateful address configuration method that keeps track of allocated address information;
   at least one bit for indicating that the method of allocating an IP address used in the neighboring network is an IPv6 stateless address configuration method that does not keep track of allocated address information; and
   at least one bit for indicating that the method of allocating an IP address used in the neighboring network is an IPv6 manual configuration method.

2. The mobile node of claim 1, wherein the IP address allocation information comprises information about a type of an IP address used in the neighboring network.

3. The mobile node of claim 1, wherein the plurality of bits further comprise:
   at least one bit reserved for future use for indicating that the method of allocating an IP address used in the neighboring network is an IPv4 address allocation method that may be used in the future; and
   at least one bit reserved for future use for indicating that the method of allocating an IP address used in the neighboring network is an IPv6 address allocation method that may be used in the future.

4. A method of providing IP address allocation information, the method comprising:
   transmitting a frame requesting IP address allocation information needed to obtain an IP address in a neighboring network;
   receiving a frame comprising the IP address allocation information requested in the transmitted frame; and
   obtaining an IP address in the neighboring network based on the IP address allocation information in the received frame to move to the neighboring network,
   wherein the IP address allocation information comprises information about a method of allocating an IP address used in the neighboring network, and
   wherein the information about a method of allocating an IP address used in the neighboring network is represented by a plurality of bits comprising at least one of:
   at least one bit for indicating that the method of allocating an IP address used in the neighboring network is an IPv4 static configuration method;
   at least one bit for indicating that the method of allocating an IP address used in the neighboring network is an IPv4 dynamic configuration method;
   at least one bit for indicating that the method of allocating an IP address used in the neighboring network is an IPv6 stateful address configuration method that keeps track of allocated address information;
   at least one bit for indicating that the method of allocating an IP address used in the neighboring network is an IPv6 stateless address configuration method that does not keep track of allocated address information; and
   at least one bit for indicating that the method of allocating an IP address used in the neighboring network is an IPv6 manual configuration method.

5. The method of claim 4, wherein the plurality of bits further comprise:
- at least one bit reserved for future use for indicating that the method of allocating an IP address used in, the neighboring network is an IPv4 address allocation method that may be used in the future; and
- at least one bit reserved for future use for indicating that the method of allocating an IP address used in the neighboring network is an IPv6 address allocation method that may be used in the future.

6. A data server, comprising:
- a receiving part receiving a frame requesting IP address allocation information needed to obtain an IP address in a second network from a mobile node located in a first network; and
- a transmitting part transmitting a frame comprising the IP address allocation information requested in the received frame,
- wherein the mobile node obtains an IP address in the second network based on the IP address allocation information in the received frame to move to the second network,
- wherein the IP address allocation information comprises information about a method of allocating an IP address used in the second network, and
- wherein the information about a method of allocating an IP address used in the neighboring network is represented by a plurality of bits comprising at least one of:
- at least one bit for indicating that the method of allocating an IP address used in the neighboring network is an IPv4 static configuration method;
- at least one bit for indicating that the method of allocating an IP address used in the neighboring network is an IPv4 dynamic configuration method;
- at least one bit for indicating that the method of allocating an IP address used in the neighboring network is an IPv6 stateful address configuration method that keeps track of allocated address information;
- at least one bit for indicating that the method of allocating an IP address used in the neighboring network is an IPv6 stateless address configuration method that does not keep track of allocated address information; and
- at least one bit for indicating that the method of allocating an IP address used in the neighboring network is an IPv6 manual configuration method.

7. The data server of claim 6, wherein the IP address allocation information comprises information about a type of an IP address used in the second network.

8. The data server of claim 6, wherein the plurality of bits further comprise:
- at least one bit reserved for future use for indicating that the method of allocating an IP address used in the neighboring network is an IPv4 address allocation method that may be used in the future; and
- at least one bit reserved for future use for indicating that the method of allocating an IP address used in the neighboring network is an IPv6 address allocation method that may be used in the future.

9. A method of providing IP address allocation information, the method comprising:
- receiving a frame requesting IP address allocation information needed to obtain an IP address in a second network from a mobile node located in a first network; and
- transmitting a frame comprising the IP address allocation information requested in the received frame,
- wherein an IP address in the second network is obtained based on the IP address allocation information in the received frame to move to the second network,
- wherein the IP address allocation information comprises information about a method of allocating an IP address used in the second network, and
- wherein the information about the method of allocating an IP address used in the neighboring network is represented by a plurality of bits comprising at least one of:
- at least one bit for indicating that the method of allocating an IP address used in the neighboring network is an IPv4 static configuration method;
- at least one bit for indicating that the method of allocating an IP address used in the neighboring network is an IPv4 dynamic configuration method;
- at least one bit for indicating that the method of allocating an IP address used in the neighboring network is an IPv6 stateful address configuration method that keeps track of allocated address information,
- at least one bit for indicating that the method of allocating an IP address used in the neighboring network is an IPv6 stateless address configuration method that does not keep track of allocated address information; and
- at least one bit for indicating that the method of allocating an IP address used in the neighboring network is an IPv6 manual configuration method.

10. The method of claim 9, further comprising receiving the IP address allocation information from the second network before receiving the frame requesting the IP address allocation information from the mobile node.

11. The method of claim 9, wherein the IP address allocation information comprises information about a type of an IP address used in the second network.

12. The method of claim 9, wherein the plurality of bits further comprise:
- at least one bit reserved for future use for indicating that the method of allocating an IP address used in the neighboring network is an IPv4 address allocation method that may be used in the future; and
- at least one bit reserved for future use for indicating that the method of allocating an IP address used in the neighboring network is an IPv6 address allocation method that may be used in the future.

* * * * *